(No Model.)

C. J. LE COUNT.
ANIMAL POKE.

No. 486,483. Patented Nov. 22, 1892.

Witnesses
Geo. W. Young
N. E. Oliphant

Inventor
Charles J. Le Count
By H. G. Underwood
Attorney

UNITED STATES PATENT OFFICE.

CHARLES J. LE COUNT, OF HENRY, SOUTH DAKOTA.

ANIMAL-POKE.

SPECIFICATION forming part of Letters Patent No. 486,483, dated November 22, 1892.

Application filed August 1, 1892. Serial No. 441,820. (No model.)

*To all whom it may concern:*

Be it known that I, CHARLES J. LE COUNT, a citizen of the United States, and a resident of Henry, in the county of Codington, and in the State of South Dakota, have invented certain new and useful Improvements in Animal-Pokes; and I do hereby declare that the following is a full, clear, and exact description thereof.

My invention has for its object to provide a simple device for attachment to a cow or analogous animal as a means to prevent the same from going through a fence having but two or three strands of wire; and the said invention consists in certain peculiarities of construction and combination of parts, hereinafter described with reference to the accompanying drawings, and subsequently claimed.

Figure 1:
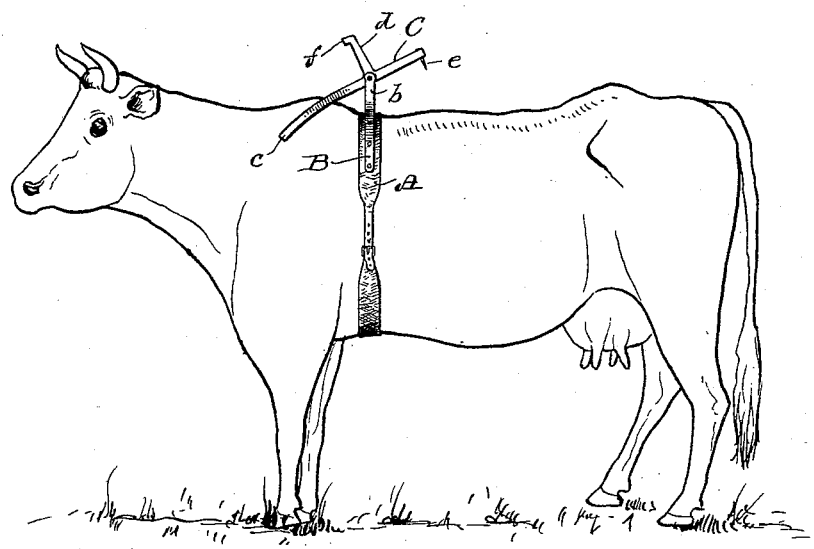
Figure 2:
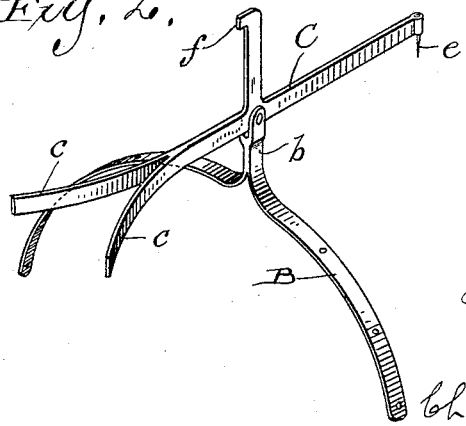

In the drawings, Figure 1 represents a side elevation of my device in position on a cow, and Fig. 2 a perspective view of certain parts constituting said device.

Referring by letter to the drawings, A represents a belt, of leather or other suitable material, and to this belt a bracket B is riveted or otherwise rigidly secured. The bracket is is of metal or other suitable material and of such construction as to have a contour corresponding to the outline of the back of the animal to which the belt is secured.

A central vertical extension $b$ of the bracket is bifurcated at its outer end, and pivoted between the furcations of this bracket extension is a lever C, having a yoke-shaped forward end $c$, an arm $d$, extended upward from the pivot-point, and a depending spur $e$ at its rear end. The yoke-shaped end of the lever normally engages the shoulders of the animal to which my device is attached, and owing to the preponderance of weight at this end of said lever the latter will automatically return to its normal position after being tilted in the manner hereinafter specified. The upward-extended arm $d$ of the lever is preferably provided with a forward extension $f$ to thus form a hook; but this hook is not absolutely essential to a successful operation of my invention.

The device above described being placed in position on an animal—such as a cow, as illustrated in Fig. 1—the upward-extended arm $d$ of the lever C is in position to oppose a strand of wire in a fence through which the animal may attempt to pass, and contact being had between said arm and fence-strand said lever will automatically tilt on its pivot, and thereby force the spur $e$ into the back of said animal to thus induce the latter to back away from the fence.

Having now fully described my invention, what I claim as new, and desire to secure by Letters Patent, is—

1. An animal-poke comprising a belt, a suitable support arranged on the belt, a spur-lever pivoted to the support, and an arm extended upward from the lever, substantially as set forth.

2. An animal-poke comprising a belt, a bracket fast on the belt and provided with a central vertical extension, a lever that is pivoted to the bracket extension and has a yoke-shaped forward end, an arm extended upward from the lever adjacent to the pivot-point of the same, and a spur depending from the rear end of said lever, substantially as set forth.

In testimony that I claim the foregoing I have hereunto set my hand, at Henry, in the county of Codington and State of South Dakota, in the presence of two witnesses.

CHARLES J. LE COUNT.

Witnesses:
A. L. LAPPIES,
C. L. DICKINSON.